May 27, 1930.　　　　O. ALTENBACH　　　　1,760,334
RUMBLE SEAT TOP
Filed May 9, 1927　　　　3 Sheets-Sheet 1
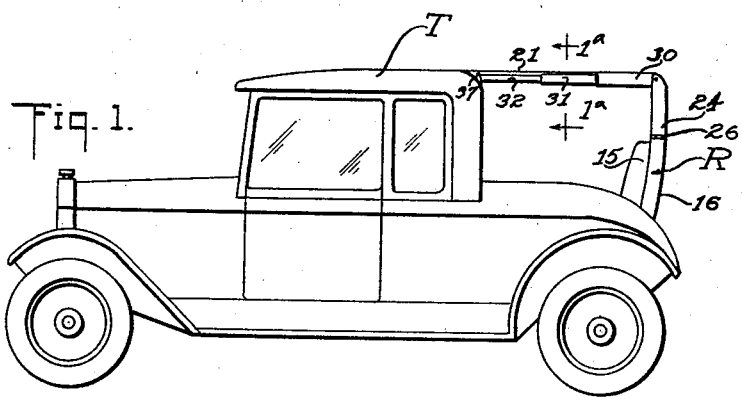
Fig. 1.
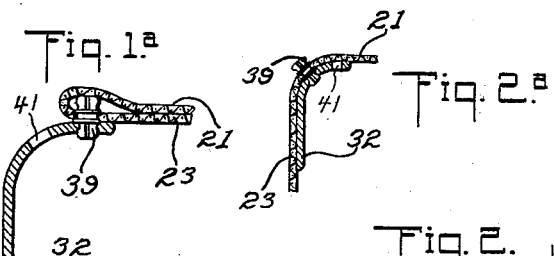
Fig. 1.ª　　Fig. 2.ª
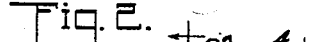
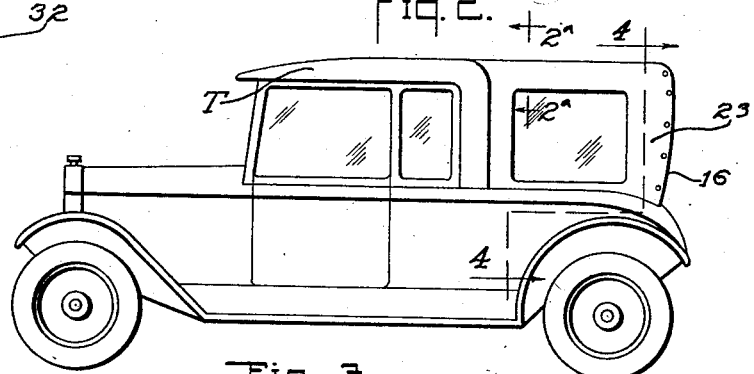
Fig. 2.
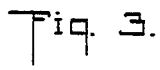
Fig. 3.
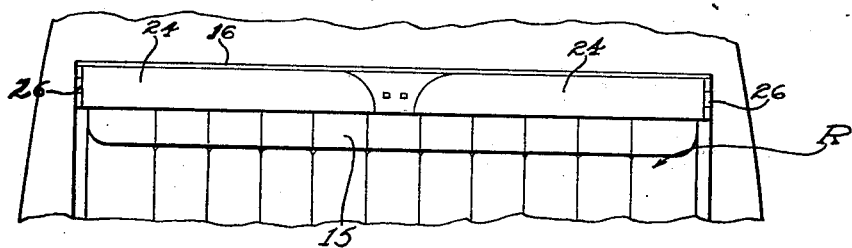
INVENTOR
Otto Altenbach;
BY Munn &Co.
ATTORNEY

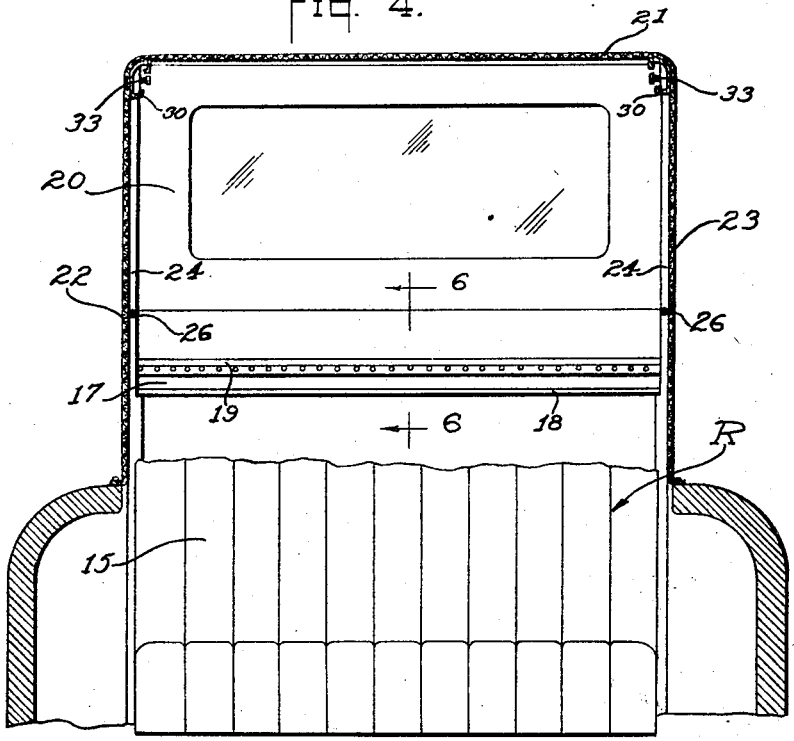
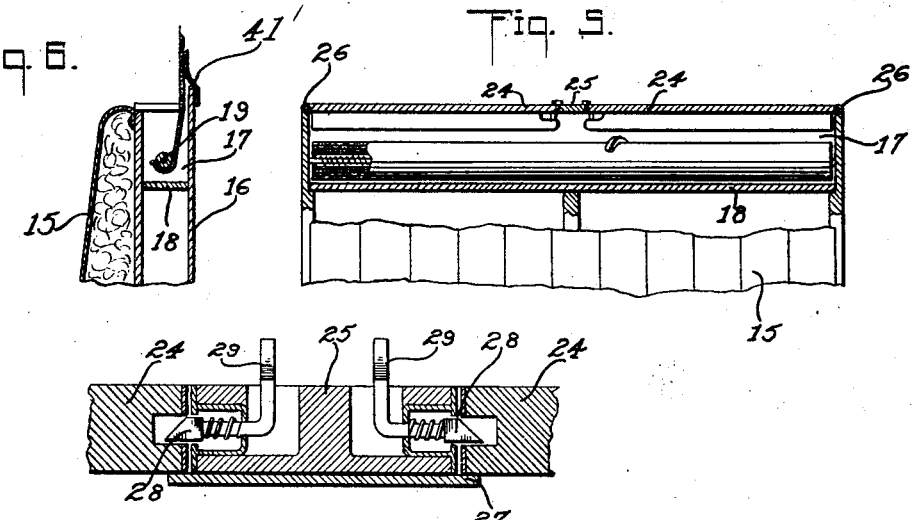

May 27, 1930.   O. ALTENBACH   1,760,334
RUMBLE SEAT TOP
Filed May 9, 1927   3 Sheets-Sheet 3
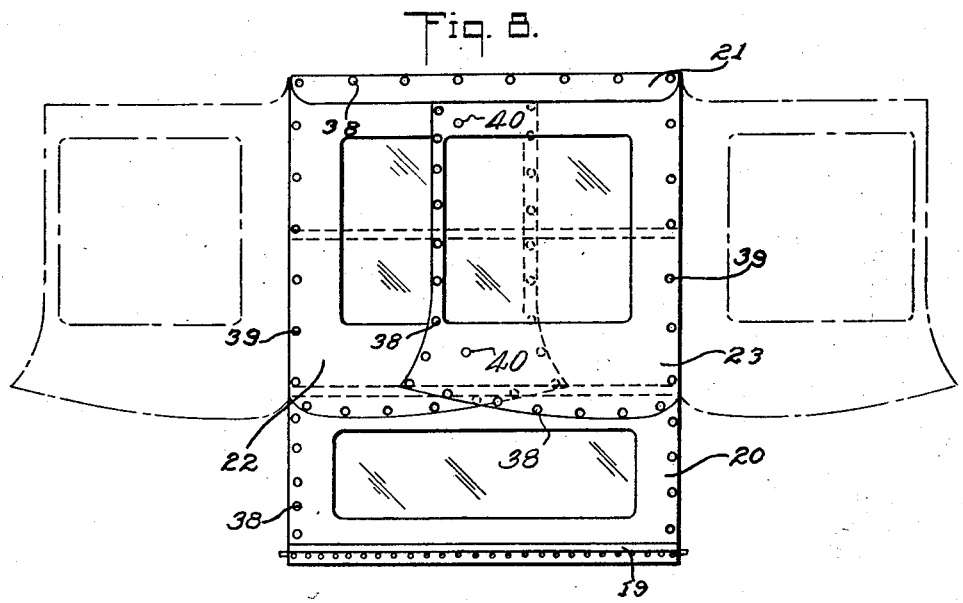
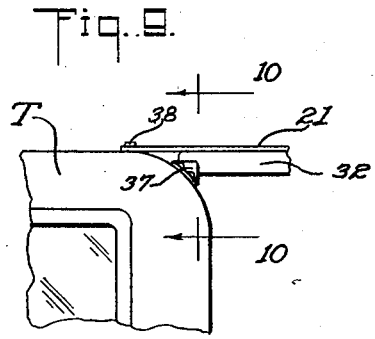
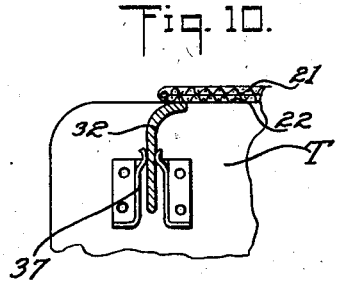
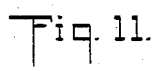
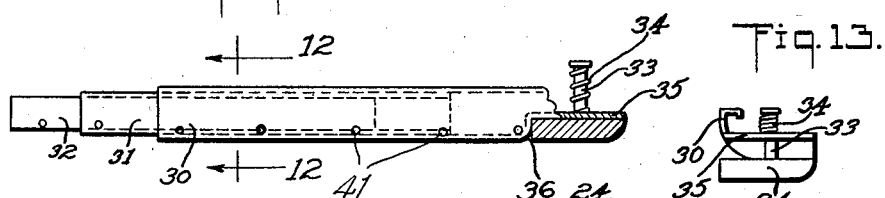
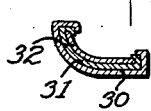
INVENTOR
Otto Altenbach
BY Munn & Co.
ATTORNEY Patented May 27, 1930

1,760,334

UNITED STATES PATENT OFFICE

OTTO ALTENBACH, OF LOS ANGELES, CALIFORNIA

RUMBLE-SEAT TOP

Application filed May 9, 1927. Serial No. 189,958.

My invention relates to automobile bodies of the roadster or coupé type having rumble seats at the rear of the driver's seat.

It is a purpose of my invention to provide in an automobile body a top for the rumble seat to protect the occupants thereof against the sun, rain and wind, the top being incorporated in the body during manufacture and completely housed in the rumble seat structure when not in use but readily capable of being extended therefrom and set up to partly or completely house the occupants of the rumble seat as the particular weather conditions may require.
I will describe only one form of rumble seat top embodying my invention, and will then point out the novel features thereof in the claims.

In the accompanying drawings, Fig. 1 is a view showing, in side, elevation, a coupé type of automobile provided with a rumble seat top, and having applied thereto one form of top embodying my invention.

Fig. 1ª is a fragmentary sectional view taken on the line 1ª—1ª of Fig. 1.

Fig. 2 is a view similar to Fig. 1 showing the side curtains of the cover sheet unfolded as distinguished from Fig. 1 and secured in position so that the cover sheet forms a complete enclosure for occupants of the rumble seat.

Fig. 2ª is a fragmentary sectional view taken on the line 2ª—2ª of Fig. 2.

Fig. 3 is an enlarged fragmentary plan view of the rumble seat with the top therefor in housed position within the seat.

Fig. 4 is a sectional view taken on the line 4—4 of Fig. 2.

Fig. 5 is a fragmentary view showing the rumble seat in front elevation and partly in section.

Fig. 6 is a fragmentary sectional view taken on line 6—6 of Fig. 4.

Fig. 7 is an enlarged fragmentary section of a portion of the rumble seat showing the latching means for the compartment doors.

Fig. 8 is a view showing in plan the cover sheet of the top in folded position, the extended position of the side sections thereof being illustrated in dash lines.

Fig. 9 is a fragmentary view showing in side elevation a portion of the driver's seat top and the manner in which the cover sheet and frame of the rumble seat top are attached to the first top.

Fig. 10 is a sectional view taken on the line 10—10 of Fig. 9.

Fig. 11 is a view showing in side elevation one of the arms of the supporting frame and in extended position in relation to its support.

Fig. 12 is a sectional view taken on the line 12—12 of Fig. 11.

Fig. 13 is a view similar to Fig. 11 showing the arm in folded position. Similar reference characters refer to similar parts in each of the several views.

Referring specifically to the drawings, my invention in its present embodiment is shown incorporated in an automobile body of the coupé type in which the driver's seat is provided with a top T, and at the rear of the top the body is provided with a rumble seat generally indicated at R. As shown in Figs. 5 and 6, the back of the rumble seat R is constructed of a cushion 15 and a back structure 16 made so as to provide internally and at the upper portion thereof a compartment 17 coextensive in length with the back with its bottom defined by a partition 18. Mounted in the end walls of the compartment 17 are the pintles of a spring roller 19, similar in construction to a shade roller, and having wound thereon a cover sheet. The construction of the cover sheet is clearly illustrated in Fig. 8, and is made of any suitable waterproof material with transparent portions in parts of the sheet to provide windows. The sheet comprises a back section 20, one edge of which is permanently secured to the roller 19. The other edge is secured to or formed integral with a top section 21 of sufficient area to span the space between the rumble seat R and the back of the top T. Along its side edges the top section is provided with side sections 22 and 23, capable of being folded beneath the top section as illustrated in solid lines in Fig. 8, or moved to extended position as illustrated in dash lines in the same figure in order that they may function as side curtains when applied as illustrated in Fig. 4.

The top of the compartment 17 is closed by a pair of doors 24 and a bridge member 25 as illustrated in Figs. 3 and 5. The doors 24 are hinged at their outer ends to the upper ends of the end walls of the partition as indicated at 26 in order that they may be swung upwardly to vertical positions as illustrated in Fig. 1. In the closed position of the doors they engage lips 27 on the bridging member 25 in order that they may function as stops to limit downward movement of the doors, thus they lie flush with the top of the seat back and the bridging member 25. In the closed position of the doors they are engaged by spring pressed latch bolts 28 mounted in the bridging member 25 and provided with handles 29 so positioned that they can be simultaneously gripped and actuated to retract the bolts and thus permit the doors to be moved to open position.

The doors 24 when in vertical position constitute parts of a frame for supporting the cover sheet in extended position to provide the protecting top for the occupants of the rumble seat. The supporting frame also includes a pair of extensible arms, each of which in the present instance is made up of three sections 30, 31 and 32 telescopically associated with each other to permit extension of the sections 31 and 32, so that the arm will extend from the corresponding door to the back of the top T, and thus form a bridge for supporting the cover sheet. The sections of the arm have the cross sectional contours illustrated in Fig. 12, with the main section 30 pivotally connected to the upper end of the corresponding door 24 by means of a pin 33. The mounting of the arm on the door is such as to permit the arm to be swung from a folded position in which it is parallel and contiguous to the door as illustrated in Figs. 5 and 13 or to an extended position at right angles to the door as illustrated in Fig. 11. It will be understood that in the folded position of the arm the sections thereof are collapsed one within the other, while in the extended position the sections can be extended one from the other to bridge the space between the door and the back of the top T. Each arm is releasably secure in either of its extreme positions by means of a spring 34 mounted on the pin 33 to urge an offset extension 35 of the section 30 into engagement with the doors 24. This extension 35 is of reduced width with respect to the section 30 to provide at the junction of the two a shoulder 36, which in the extended position of the arm abuts the forward vertical edge of the door and thereby provides a rigid connection between the two. In moving the arm to folded position the shoulder 36 rides across the edge of the bar, thereby elevating the extension 35 on the pin 33, and in so doing compresses the spring 33 so that when the arm reaches folded position the spring tends to maintain the arm in such position on the door.

To releasably secure the forward ends of the arms to the top T, spring clips 37 are secured to the top T as illustrated in Figs. 9 and 10. These clips are adapted to receive the forward ends of the section 32 to connect the sections to the top. They should be of any suitable construction to firmly secure the arm sections to the top, and in the present instance they are constructed of companion resilient arms having outwardly flared free ends to facilitate the insertion of the sections.

The manner in which the cover sheet is attached to the frame arms, vehicle body and top T when in fully extended position is thoroughly illustrated in Figs. 2, 2a and 4. Parts of conventional separable fasteners 38 may be provided along the vertical edges of the back section 20, the forward edge of the top section 21 and the bottom horizontal edges of the side sections 22 and 23, to engage with other parts secured, respectively, to the doors 24, top T and the body of the automobile. Further, double headed fasteners 39 are provided on the side sections as illustrated in Figs. 1a and 2a for detachably securing the top section or the side sections to the frame arms, depending upon whether it is desired to have the side sections of the cover sheet up or down. In Fig. 1 the side sections are shown up, and they are adapted to be secured in elevated position beneath the top section by engaging the fasteners 39 with the supporting arms in the manner illustrated in Fig. 1a. The confronting ends of the side sections may be provided with separable fasteners 40 (Fig. 8) to secure them in folded position beneath the top section. In the extended position of the side sections as illustrated in Fig. 2, the fasteners 39 are associated with the supporting arms as illustrated in Fig. 2a. To permit the fastening members to occupy the two positions illustrated in Figs. 1a and 2a, the supporting arms of the frame are provided with opening 41 arranged in pairs spaced transversely of the arms to receive one head or the other of the corresponding fastening member 39.

With the top for the rumble seat in fully extended position as illustrated in Figs. 2 and 4, it provides a complete closure for the occupants of the rumble seat R, and through the medium of the supporting frame it is rigidly held in extended position. The back section of the cover sheet 20 may be provided with a flap 41' (Fig. 6) which prevents the passage of rain downwardly into the compartment 17 between the sections and the seat back. When desiring to lower the top, the cover sheet can be readily detached from the automobile top and body and the doors 24, so that by folding the top in the manner illustrated in solid lines in Fig. 8, the spring roller 19 will function to wind the sheet within the compartment 17. By detaching the supporting arms from the clips 37, the sections thereof can be collapsed and the arms moved to the folded position as illustrated in Fig. 13, so that when the doors 24 are moved to closed position, the arms will be disposed beneath the doors and thus housed within the compartment.

Although I have herein shown and described only one form of rumble seat top embodying my invention, it is to be understood that various changes and modifications may be made herein without departing from the spirit of the invention and the spirit and scope of the appended claims.

I claim as my invention:

1. In combination, a rumble seat back having a compartment therein, a spring roller in the compartment, a cover sheet secured to the spring roller and normally wound thereon, the cover sheet having side sections, a pair of doors for the compartment hingedly connected to the seat back to occupy a folded position in which they form a closure for the compartment and an extended position in which they are disposed vertically at opposite ends of the seat back, a pair of extensible arms each composed of a plurality of telescopically associated sections and pivoted on the doors to occupy a folded position in which they are disposed parallel to and at the inner sides of the doors and an extended position in which they are at right angles to the upper ends of the doors when the latter are extended, so as to project forwardly to the top of an automobile for attachment thereto, spring means for maintaining the arms in either of said positions, and means for detachably securing the side sections to the seat back and doors to maintain the cover in covering-forming position.

2. A combination as embodied in claim 1 wherein spring clips are provided and adapted to be secured to an automobile top for receiving and clampingly engaging the free ends of the arms in a manner to secure the arms in extended position and against lateral movement.

OTTO ALTENBACH.